United States Patent
Nagarajan et al.

(10) Patent No.: US 6,625,312 B1
(45) Date of Patent: Sep. 23, 2003

(54) DOCUMENT CLASSIFICATION USING SEGMENTATION TAG STATISTICS

(75) Inventors: Ramesh Nagarajan, Fairport, NY (US); Xing Li, Webster, NY (US); Francis K. Tse, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/514,626

(22) Filed: Feb. 28, 2000

(51) Int. Cl.[7] .......................... G06K 9/34; G06K 15/00
(52) U.S. Cl. ..................... 382/176; 382/180; 358/2.1; 358/462
(58) Field of Search ................. 382/173, 176, 382/180; 358/462, 2.1

(56) References Cited

U.S. PATENT DOCUMENTS

| | | | |
|---|---|---|---|
| 5,327,262 A | 7/1994 | Williams | 358/462 |
| 5,369,507 A * | 11/1994 | Tanaka et al. | 358/462 |
| 5,765,029 A | 6/1998 | Schweid et al. | 395/61 |
| 5,778,156 A | 7/1998 | Schweid et al. | 395/61 |
| 5,850,474 A | 12/1998 | Fan et al. | 382/173 |
| 5,852,678 A | 12/1998 | Shiau et al. | 382/176 |
| 5,881,166 A | 3/1999 | Farrell | 382/168 |
| 5,909,537 A * | 6/1999 | Furukawa et al. | 358/1.9 |
| 6,137,907 A * | 10/2000 | Clark et al. | 382/180 |
| 6,240,205 B1 * | 5/2001 | Fan et al. | 382/173 |
| 6,424,724 B1 * | 7/2002 | Ming-Cheng | 381/361 |
| 6,516,091 B1 * | 2/2003 | Nagarajan et al. | 382/173 |
| 2002/0061133 A1 * | 5/2002 | Ohta et al. | 382/176 |

* cited by examiner

Primary Examiner—Bhavesh M. Mehta
Assistant Examiner—Christopher Sukhaphadhana
(74) Attorney, Agent, or Firm—William Eipert

(57) ABSTRACT

A first aspect of the of the present invention is a system and method for classifying an input document based a segmentation tag statistics. The method includes receiving first pass segmentation tags for a plurality of pixels within a block of image data; determining an image type for the block of image data using statistics compiled from the first pass segmentation tags; and generating rendering tags for pixels within the block of image data as function of second pass segmentation tags and the image type. Beneficially, the image type identified for the block of image data is used to optimize the rendering process.

13 Claims, 6 Drawing Sheets

DOCUMENT CLASSIFICATION USING SEGMENTATION TAG STATISTICS

BACKGROUND OF THE INVENTION

The present invention generally relates to a method and apparatus to improve the appearance of scanned images rendered on a recording medium. More particularly, the present invention is directed to automatically classifying the content of a scanned image based on segmentation tags statistics.

In the reproduction or display of images, and more particularly, the rendering of image data representing original document that has been electronically scanned, one is faced with the limited resolution capabilities of the rendering system. Tailoring an image processing system to offset the limitations of the rendering system is difficult due to the divergent processing needs required by different image types. Optimizing a system for one image type typically comes at the expense of degraded rendering of other image types. For example, optimizing the system for reproduction of continuous tones (contones) or photographic images often comes at the expense of degraded rendering of text and line art. Further complicating the reproduction of original documents is the reality that a document may be comprised of multiple image types (image classes).

To address this situation, digital reproduction devices often use automatic image segmentation techniques. Auto-segmentation is a well known operation that may use any of a number of classification functions (e.g., auto-correlation, frequency analysis, pattern or template matching, peak/valley detection, histograms, etc.) to analyze video image data and classify image pixels as one of several possible image classes based on the pixel characteristics. Auto-segmentation processes typically generate a pixel classification signal, known as a segmentation tag, that identifies the pixel as a particular image class. A one-pass digital reprographic system (scanning and printing done in a single pass of the image) gets just one chance to analyze and classify each pixel of an image based on several pixels from a few scanlines of neighboring data. Due to the limited context for classification one-pass auto-segmentation can include erroneous and/or abrupt switching between image classes which, in turn, may result in the formation of visible artifacts in the resulting output image.

One approach to improving image classification in digital reproduction systems is the use of an image classification system which utilizes a fuzzy membership into each category or class. In a fuzzy classification system the classes are not mutually exclusive, thereby eliminating problems with class switching and also allowing those areas to have processing different than that of any of the other pre-defined classes; i.e., the output can choose between a continuum of possible image processing techniques. While fuzzy classification hides or eliminates most misclassification, some users find that the overall image quality is compromised.

Another approach to improve the reproduction of scanned images is to employ a two-pass auto-windowing process. In a two-pass process, the scanned image data is analyzed twice. The first-pass is used to automatically locate "windows" contained within a scanned document image by identifying image runs within a scanline and combining image runs from adjacent scanlines into windows. In the second-pass, the pixels within each window are classified and labeled as a particular image type. A two-pass auto-windowing process provides good image quality and avoids most of the switching artifacts associated with single pass system. However, two-pass systems perform a large number of intensive calculations and require buffering of tags, thus making them much more costly and complex than single pass systems.

Yet another approach to improving the reproduction of images is to provide multiple processing modes, each optimized for a different type of original. Most digital copiers provide for optimized processing based on the content of an original document by including user selection of one of multiple copy modes such as, for example, modes for text documents, photographs, mixed content, etc. in addition to an automatic mode. This selection allows a user to choose alternative modes to avoid defects that the user may perceive with the automatic mode. However, such a system requires the user to be familiar with the characteristics of each image type to properly identify the proper mode. Without such familiarity, users often must make and compare copies from different modes to obtain the best image quality for a given document. Furthermore, the automatic mode in such systems typically makes use of one of the segmentation options identified above. Thus, such devices suffer from the limitations and drawbacks identified above.

Therefore, it is desirable to have a system that minimizes segmentation artifacts and provides optimum image quality.

The following references may be found relevant to the present disclosure:

U.S. Pat. No. 5,327,262 to Williams which discloses in conjunction with an image segmentation arrangement in which an image is processed with an image type detection arrangement, a morphological filtering operation which initially provides a noise removal filter operating the image detection signal to remove noise within an area of the image detection signal and subsequently provides a hole filling filter which bridges small gaps in the image type detection results.

U.S. Pat. No. 5,765,029 to Schweid et al. which discloses a method and system that electronically fuzzy classify a pixel belonging to a set of digital image data with respect to a membership of the pixel in a plurality of image classes. This process determines a fuzzy classification of the pixel and generates an effect tag for the pixel based on the fuzzy classification determination.

U.S. Pat. No. 5,778,156 to Schweid et al. discloses system and method that electronically image process a pixel belonging to a set of digital image data with respect to a membership of the pixel in a plurality of image classes. This process uses classification to determine a membership value for the pixel for each image classes and generates an effect tag for the pixel based on the fuzzy classification determination. The pixel is image processed based on the membership vector of the pixel.

U.S. Pat. No. 5,850,474 to Fan et al. discloses a method and apparatus for segmenting image data into windows and for classifying the windows as typical image types which include making two passes through the image data. The method includes a step of making a first pass through the image data to identify windows and to record the beginning points and image types of each of the windows, and a step of making a second pass through the image data to label each of the pixels as a particular image type.

U.S. Pat. No. 5,852,678 to Shiau et al. discloses a method and apparatus for improving digital reproduction of a compound document image containing half-tone tint regions and text and/or graphics embedded within the half-tone tint regions. The method entails determining a local average pixel value for each pixel in the image, then discriminating and classifying based on the local average pixel values, text/graphics pixels from half-tone tint pixels.

SUMMARY OF THE INVENTION

One aspect of the present invention is a method of classifying image data based on tag statistics and rendering the image data accordingly to provide a favorable image quality. The method includes receiving segmentation tags for a block of scanned image data; determining an image type for the block of scanned image data as a function of the segmentation tags; and generating rendering tags pixels within the block of scanned image data as function of the image class for the pixel and the image type.

Another aspect of the present invention is a system for classifying image data based on tag statistics. The system includes a segmentation processor generating segmentation tags for pixels within a block of scanned image data; a tag analyzer for collecting tag statistics for the segmentation tags; a scanning processor for determining an image type for the block of image data based on the tag statistics and identifying a tag lookup table based on the image type; and a tag remapping circuit using the tag lookup table to remap the segmentation tags to rendering tags.

In accordance with another aspect of the present invention there is provided a system for processing image data representing a scanned image. The system includes an image input terminal providing the image data; a segmentation processor to generate first pass segmentation tags for pixels within a block of the image data; a tag analyzer connected to receive the segmentation tags and compile tag statistics for the received segmentation tags; a scanning processor, connected to receive the compiled tag statistics, for determining an image type for the block of image data based on the compiled tag statistics and identifying a tag lookup table based on the image type; a tag remapping circuit using the tag lookup table to remap second pass segmentation tags to rendering tags; a rendering processor generating print ready data in response to the rendering tag and the block of image data; and an image output terminal to generate an output image in response to the print ready data.

BRIEF DESCRIPTION OF THE DRAWINGS

The following is a brief description of each drawing used to describe the present invention, and thus, are being presented for illustrative purposes only and should not be limitative to the scope of the present invention, wherein.

DESCRIPTION OF THE PREFERRED EMBODIMENT

Figure 1:
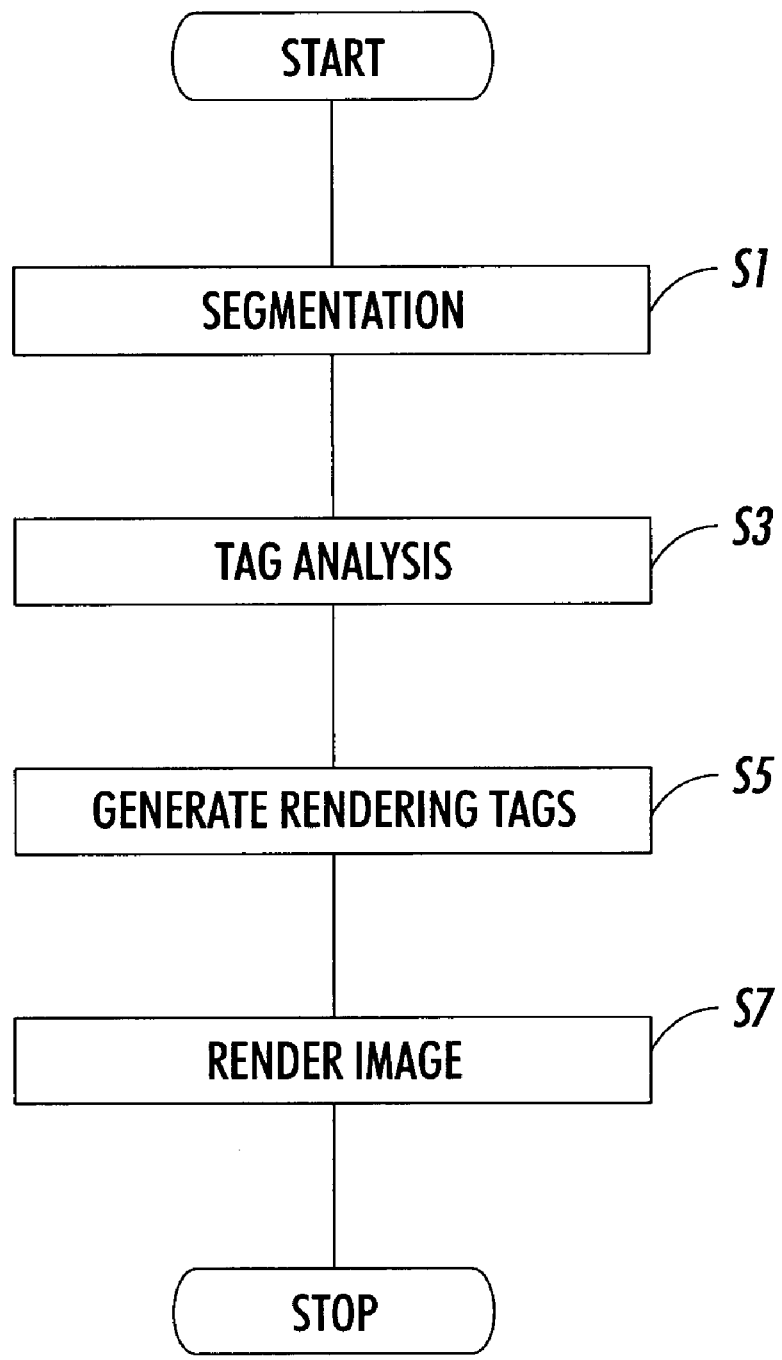
FIG. 1 is a flowchart illustrating an embodiment of a method to process segmentation tags according to the concepts of the present invention.

The following will be a detailed description of the drawings illustrated in the present invention. In this description, as well as in the drawings, like reference numbers represent like devices, circuits, or circuits performing equivalent functions.

Figure 6:
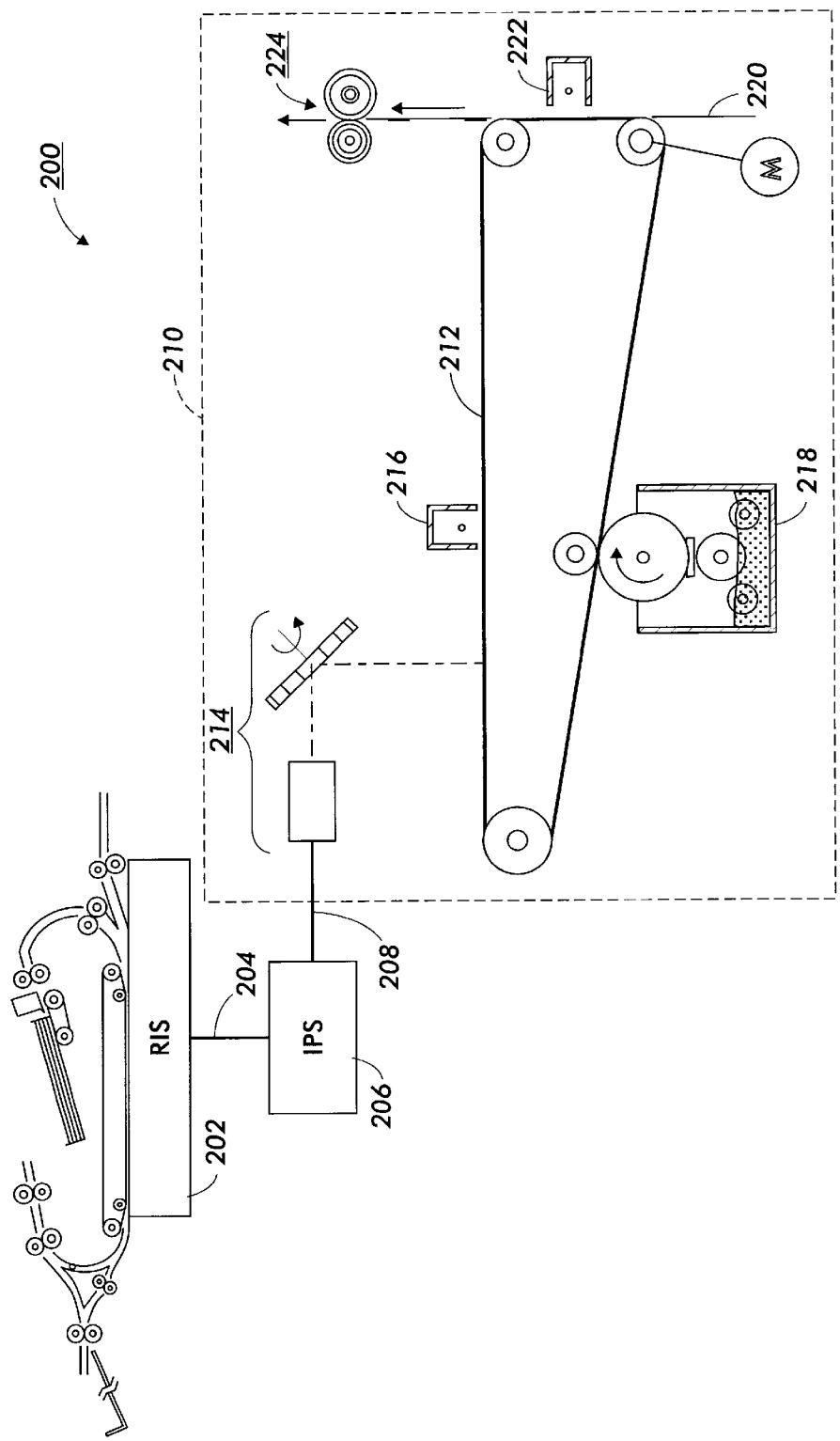
FIG. 6 is a partial schematic perspective view of a suitable system-level embodiment for one or more aspects of the present invention.

Turning now to FIG. 6, there is shown an embodiment of a digital imaging system 200 that incorporates features of the present invention. Imaging system 200 includes image source 202 such as a raster input scanner or similar image input terminal to provide video image data 204 to image processing system 206. Image data 204 may be obtained through line by line scanning of a document image by one or more photosensitive elements, such as a multiple photosite array of charge couple devices commonly referred to as CCDs. Although shown as a raster input scanner, it is understood that image source 202 may comprise a computer workstation, a data storage device, a network or any similar or equivalent image input terminal to generate image data 204.

Image processing system (IPS) 206 processes the received image data 204 to produce print ready data 208 that is supplied to image output terminal (IOT) 210. In response to print ready data 208, IOT 210 generates an output image on a suitable media (e.g., print or display). Although illustrated as an electrophotographic print engine, it will become evident from the following discussion that the present invention is useful with a wide variety of output devices such as ink jet, ionographic, thermal, etc. Furthermore, the present invention is not limited in its application to copying and printing machines and may be incorporated in other output terminals such as electronic display systems including CRTs, LCDs, LED, etc.

Image output terminal 210 is shown as operating on print ready data 208 from IPS 206 to generate a document in a single pass of a charge retentive surface in the form of photoreceptor belt 212. In one example, photoreceptor 212 comprises a multi-pitch belt that is written on with an imaging source 214. Imaging source 214 is shown as comprising a laser based raster output scanning device (ROS), although it is to be understood that other sources, for example an LED printbar, might be used. Briefly, photoreceptor 212 is uniformly charged as it passes charging station 216 which may comprise, for example, a corona generating device, a charging roller, etc. The charged photoreceptor 212 then passes ROS 214 which exposes the photoreceptor in response to image data from IPS 206 thereby forming an electrostatic latent image on the photoreceptor. The electrostatic latent image is then developed with toner at developing station 218 to produce a toner image on belt 212. The toner image is then transferred to a print media 220 at a transfer station 222. After transfer, the image is fused to the print media at a fusing station 224. Upon fusing the resulting print, it may be inverted for duplexing or simply outputted.

It will be apparent to those of ordinary skill in the art that the print engine shown may be modified to generate a color document. For example, by adding successive charging, exposure, and developing stations, a recharge, expose, and develop image on image process can be implemented such that the print engine can produce a color document in a single pass of the photoreceptor. Similarly, the print engine may comprise a single ROS and several developing stations, each having a different color toner. With such a system the print engine can produce a color document using several passes of the photoreceptor through the ROS and charging station wherein each pass is developed at a different developing station.

The present invention is directed towards aspects of image processing system 206 depicted in FIG. 6, and in particular, to processing image data improve the appearance of scanned Images rendered on a recording medium by IOT 210. More specifically, the present invention is directed a system and method to classify an input document into one of several predetermined classes based on segmentation tag statistics. The present invention classifies a block of scanned image data as one of several predetermined image types based on segmentation tag statistics and, based upon the image type, generates an appropriate rendering tag for each type pixel within the scanned image that provides favorable image quality in the rendered image.

Referring now to FIG. 1, there is shown various steps in one embodiment of a process in accordance with the present invention. In this process, segmentation Step S1 receives video image data which generally comprises a plurality of scanlines with each scanline comprising image data such as intensity information for a plurality of pixels. Step S1 buffers multiple scanlines of the received image data into memory and identifies a target pixel and its neighbors. The image data for the target pixel and its neighbors are analyzed to generate a segmentation tag for the target pixel identifying the image class of each pixel.

Segmentation Step S1 performs a segmentation operation that analyzes the image data for the target pixel and its neighbors to determine the image class of the target pixel. Some common image classes include: background, edge, graphics, smooth contone, rough contone, halftones of various frequencies which may include fuzzy frequencies, text, text on halftone, text on contone, etc. The analysis and determination of image class can be based upon any of a number of well known classification functions including, but not limited to, auto-correlation, frequency analysis, pattern or template matching, peak/valley detection, histograms, etc. Additionally, determining whether the intensity of a target pixel is significantly different than the intensity of its neighboring pixels can be used to classify edge pixels.

Next, at Step S3, the segmentation tags generated at Step S1 are analyzed to determine an image type identifying the content of the video image data received. More specifically, statistics are gathered for the segmentation tags associated with a block of the received image data and, the content of block of image data is classified as being one of several predefined image types based on the tag statistics. Beneficially, each block of video image data corresponds to a discrete section of the received video image data so as not to introduce any artifacts into the image which may result when switching from between image types. In describing the present invention, a scanned page will be considered as a single block of data. However, it should be appreciated that each page can be separated into several blocks of video image data. Similarly, a block of video image data can comprise more than one page.

Step S5 generates rendering tags for pixels within each block of image data for which an image type was determined in Step S3 as a function of the image type of that block of image data. That is, in Step S5 the segmentation tags for pixels within a block of image data are remapped to rendering tags according to the image type (image content) of the block.

In Step S7, the block of image data is rendered into print ready data. The overall rendering process is optimized based on the image type (i.e., content) of the block of image data while the rendering of individual pixels within the image data is controlled by the rendering tags. That is, rendering options such as the processing (e.g., halftoning, error diffusion, anti-aliasing, thresholding, etc.) to be employed for each image class; thresholds; halftone screens; Tone Reproduction Curves; etc. are optimized based on the image type for the block. The rendering tags, on the other hand, simply identify the image class for each pixel in the block.

Figure 2:
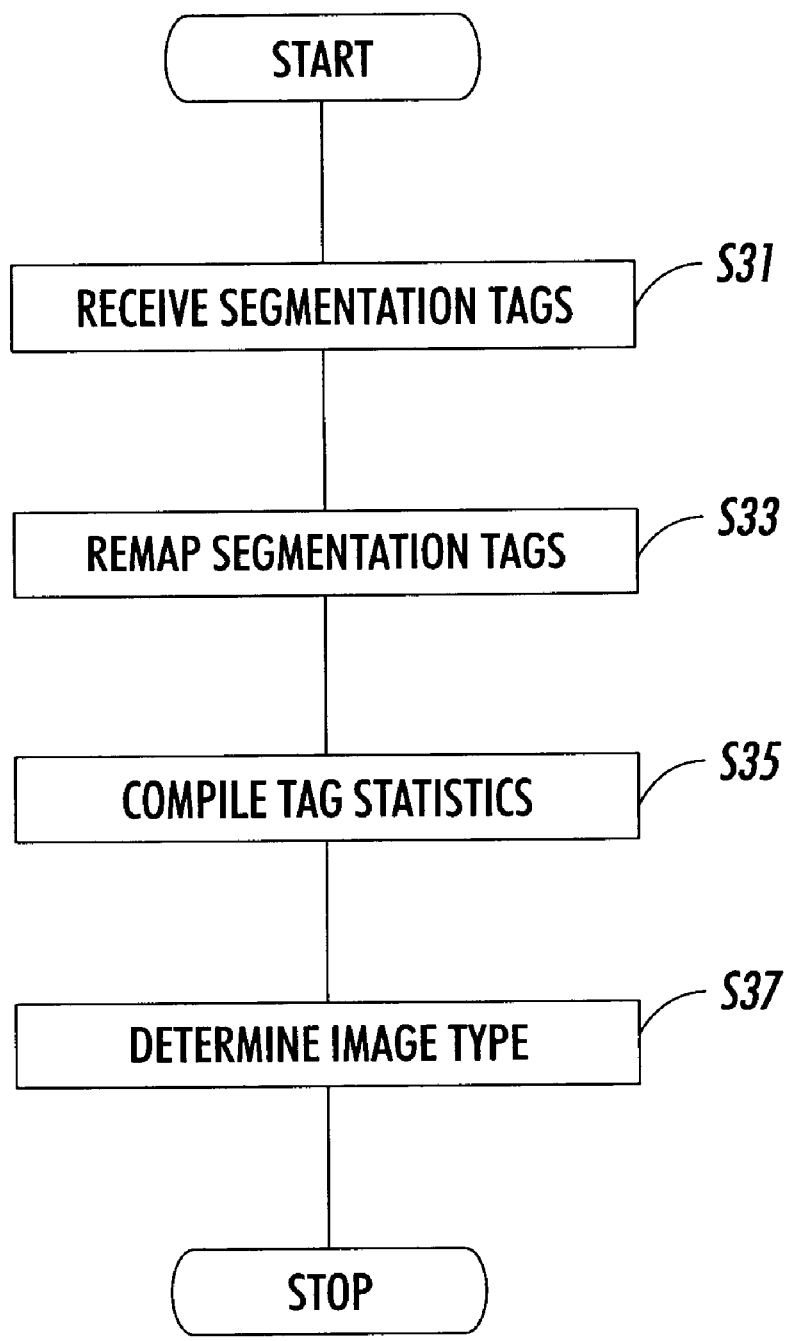
FIG. 2 is a flowchart illustrating a process to classify a scanned image based on tag statistics according to the concepts of the present invention.

Referring now to FIG. 2, there is shown more detail of the process carried out in Step S3 of FIG. 1. More specifically, FIG. 2 illustrates an embodiment of a process for compiling segmentation tag statistics and determining an image type (identifying the image content) based on the tag statistics. In this process, Step S31 receives segmentation which are then internally remapped at Step S33 to a set of segmentation tags which are used to determine the image type for the scanned page.

More specifically, if the segmentation operation generates tags classifying each pixel as being one of 20 image classes and the determination of the content (image type) of the page of data is based on statistics gathered for 8 image classes, it may be beneficial to remap some or all of the twelve image classes for which statistics are not gathered into one of the 8 classes for which statistics are gathered. For example, assuming that the determination of image type is based on the distribution of three image classes (contone, low frequency halftone, and high frequency halftone) and that the segmentation operation generates tags for six image classes (contone, rough contone, very low frequency halftone, low frequency halftone, high frequency halftone, very high frequency halftone), a more accurate determination the distribution of three image classes may be had if the image classes (segmentation tags) are remapped as follows: contone and rough contone to contone; low and very low frequency halftone to low frequency halftone, and high and very high frequency halftone to high frequency halftone. It should be appreciated that any remapping performed will depend, in part, on the image classes for which segmentation tags are generated and the image classes used for determining image content.

After the remapping of segmentation tags at Step S33, statistics are compiled for the segmentation tags of the page of image data at Step S35. The statistics compiled are used by Step S37 to determine the image type of the page based on a set of predefined rules. Possible statistics which may be compiled include a normalized histogram, a frequency distribution of each of the different segmentation tags, a weighted count of segmentation tags, etc. It will be appreciated that those skilled in the art may recognize alternative statistics which may be complied. Beneficially, every segmentation tag associated with the page is included when compiling segmentation tag statistics. However, it should be appreciated that the tag statistics may be compiled from less than all the segmentation tags. For example, if the hardware and/or software performing the statistics compilation cannot keep up with the data rate, a sub-sampling of the segmentation tags within the page may be used to compile statistics.

By way of example, in one embodiment of the present invention Step S33 remaps the received segmentation tags into the following nine (9) image classes: Text, Text on Low Frequency, Text on High Frequency, Contone, Black, White, Very Low Frequency Halftone (VLFHT), Low Frequency Halftone(LFHT) or High Frequency Halftone (HFHT). Step S35 collects a normalized histogram of these nine states. Based on a set of predefined rules, Step S37 identifies the content of the page as being one of the following image types: Low Frequency Halftone (LFHT), High Frequency Halftone (HFHT), Contone, Contone plus Text, Text, or Mixed (mixture of low and high frequency components). One possible set of rules for determining image content within a block of image data using the tag statistics generated by Step S35 is described by the following C-like programming statement:

```
If (fraction[TEXT] > 15)   Image Type = TEXT
else if (((fraction[VLFHT] = 0) and (fraction[HFHT] > 5)) or
        ((fraction[VLFHT] > 0) and ((fraction[HFHT] /
        fraction[VLFHT]) > 4))
     Image Type = HFHT
else if (((fraction[HFHT] = 0) and (fraction[VLFHT] > 5)) or
        ((fraction[HFHT] > 0) and ((fraction[VLFHT] /
        fraction[HFHT]) > 4))
     Image Type = LFHT
else if ((fraction[BLACK] > 40) or
        ((fraction[BLACK] + fraction[CONTONE]) > 60) or
        ((fraction[BLACK] + fraction[CONTONE] +
        fraction[WHITE]) > 80)
     {
     if ((fraction[HFHT] +fraction[LFHT]) > 3)  Image Type = HFHT
     else if (fraction[TEXT] > 3)  Image Type = TEXT
     else Image Type = CONTONE
     }
else Image Type = MIXED
``` wherein fraction[X] is the percentage of pixels having the segmentation tag X. It is understood that the above set of rules is provided by way of example to illustrate the classification process. One skilled in the art may identify different rules or use different tag statistics for determining the image type (image content) within a block.

Figure 3:
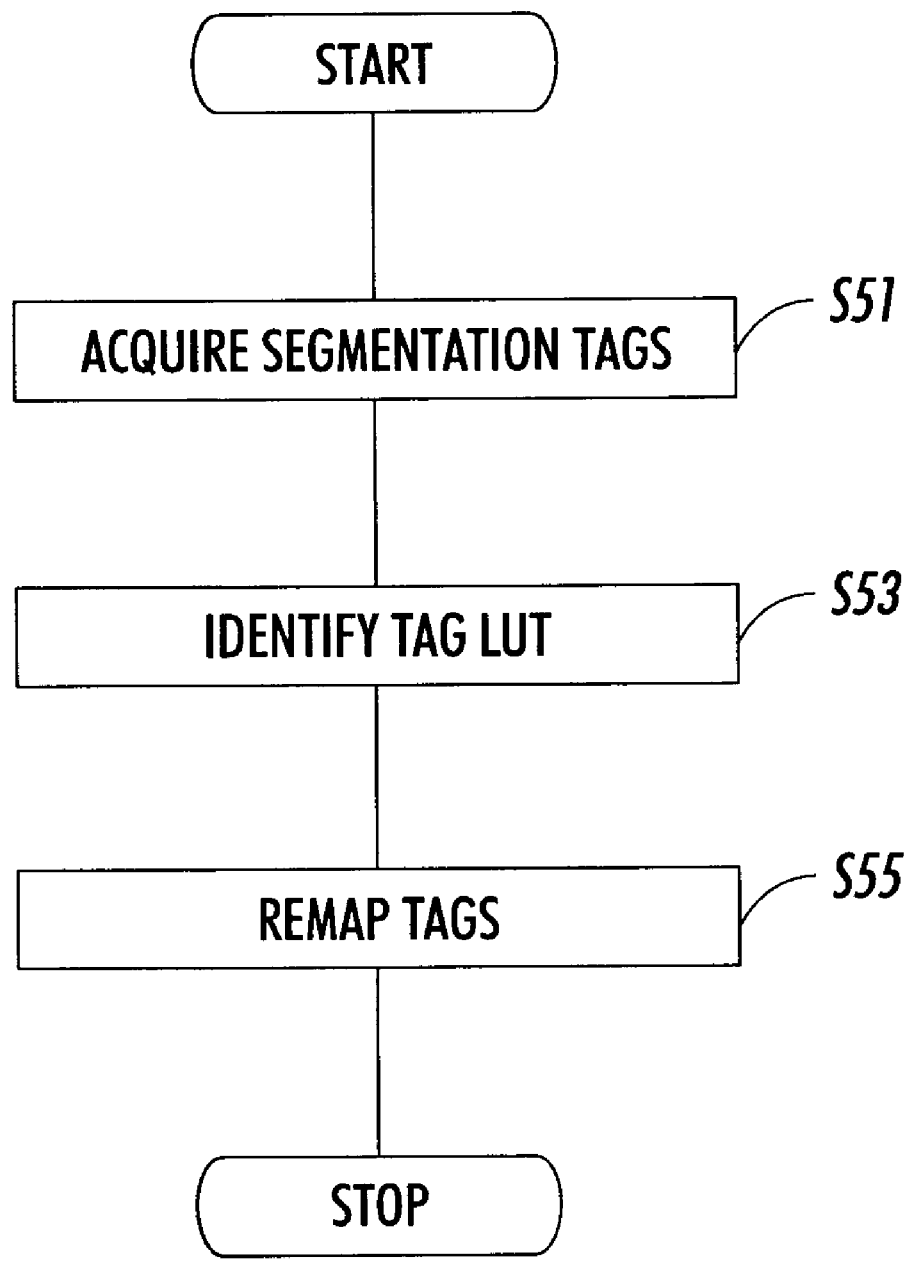
FIG. 3 is a flow chart illustrating various steps in a process to remap segmentation tags based on the scanned image type according to the concepts of the present invention.

Referring now to FIG. 3, there is shown, in more detail, a process of generating rendering tags as carried out in Step S5 of FIG. 1. More specifically, FIG. 3 illustrates that Step S51 acquires original (ie., not remapped) segmentation tags for the pixels comprising the page of image data. Step S51 may acquire the original segmentation tags by retrieving the segmentation tags generated by Step S1 from memory or other storage location or by generating the segmentation tags using a process similar to that of Step S1 with video image data that is retrieved from memory or obtained by rescanning.

Step S53 identifies a tag lookup table (LUT) based upon the content of the video image data which, in a preferred embodiment, is the image type for the page as determined at Step 37 of FIG. 2. The tag LUT identified at Step S53 maps each of the segmentation tags (image classes) which may be generated by a segmentation operation to an optimal rendering tag according to the image type. In a preferred embodiment, the tag LUT for each of the possible image types assigned in Step S37 is generated in advance and Step S53 simply retrieves the appropriate tag LUT from storage. Using the tag LUT identified in Step S53, Step S55 remaps the segmentation tags acquired at Step S51 to obtain a set of rendering segmentation tags for the page of image data.

As mentioned above, optimizing a rendering process for one image type typically comes at the expense of degraded rendering of other image types. The content of the page was identified as being a specific image type in Step S37 and the rendering process can be optimized for the given image type. However, not every pixel within the page will be compatible with the rendering process optimized for the image type identified for the page. By understanding the rendering and marking processes, tag LUTs can be generated to remap segmentation tags according to the content of the page so as to provide a favorable image quality.

One method of generating the tag LUTs employs rendering and marking various common image structures tagged (classified) as several different image classes in methods optimized for a given image type. Based on the output images, image quality characteristics can be measured and compared. Based on these comparisons the appropriate rendering tag for each segmentation tag can be identified. It should be appreciated that models of the rendering process could be used in place of or in conjunction with the actual rendering process.

Figure 4:
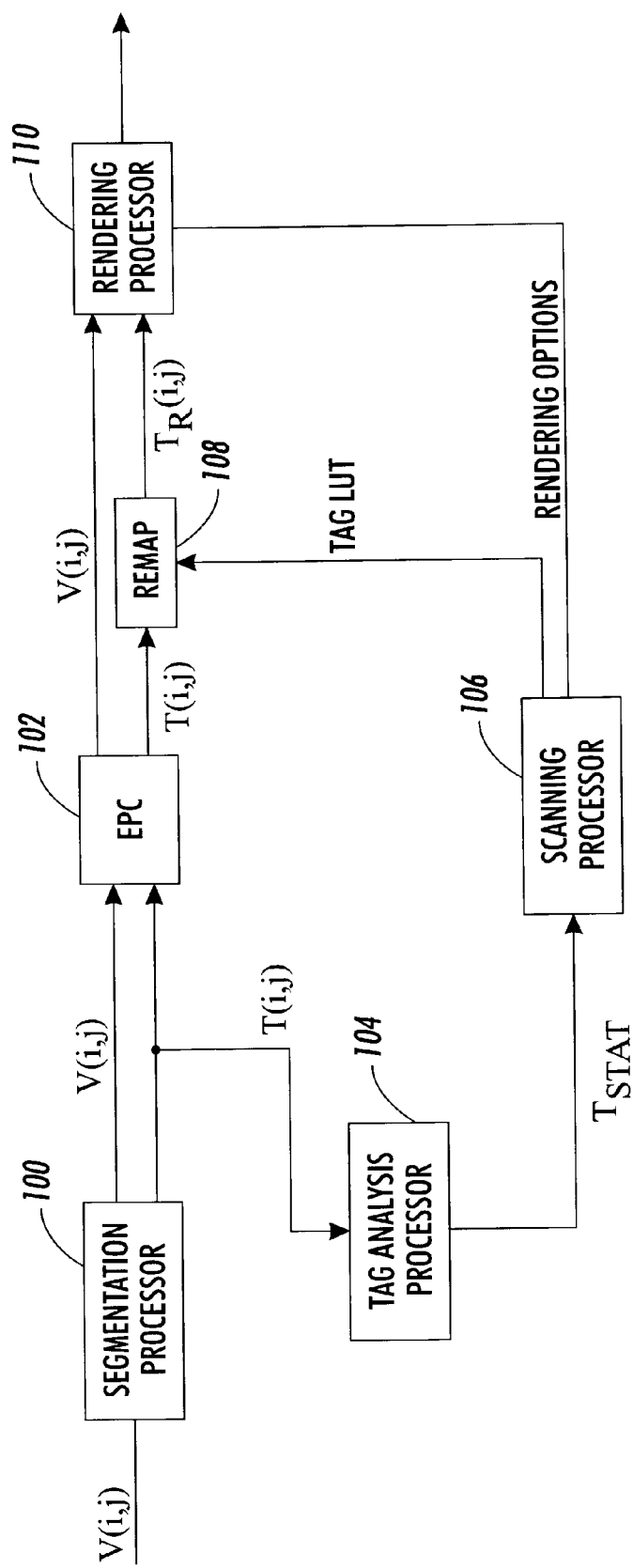
FIG. 4 is a block diagram of an system to classify scanned images based on segmentation tags statistics in accordance with the present invention.

Referring now to FIG. 4, there is shown a block diagram of a circuit, according to one embodiment of the present invention, which is utilized to automatically classify an input document into one of several predetermined classes based on segmentation tag statistics. As illustrated in FIG. 4, video image data V(i,j) is fed to segmentation processor 100 which analyzes the video image data and generates a segmentation tag T(i,j) identifying the image class of each pixel within the video image data. From the segmentation processor, image data V(i,j) is fed to electronic pre-collation memory (EPC) 102.

The segmentation tags T(i,j) generated at segmentation processor 100 are also fed to (EPC) 102 as well as tag analysis processor 104. Tag analysis processor 104 remaps the segmentation tags and collects statistics for the remapped tags associated with a block of image data and produces a tag statistics signal $T_{stat}$. The tag statistics signal $T_{stat}$ is fed to a scanning control processor 106 wherein the image type for the block of image data is determined based on the tag statistics. The image type identifies the content of the block of image data. Based on the image type, processor 106 identifies an appropriate tag lookup table and optimizes the rendering process. Processor 106 loads the tag LUT into a tag remap circuit 108.

After the appropriate tag LUT is loaded for remapping circuit 108, segmentation tags T(i,j) are recalled from EPC 102 and remapped to rendering tags $T_R(i,j)$. The remapped rendering tags $T_R(i,j)$ and the video image data V(i,j) are then fed to rendering processor 110 wherein the image data is rendered to provide print ready for output on a suitable IOT.

Figure 5:
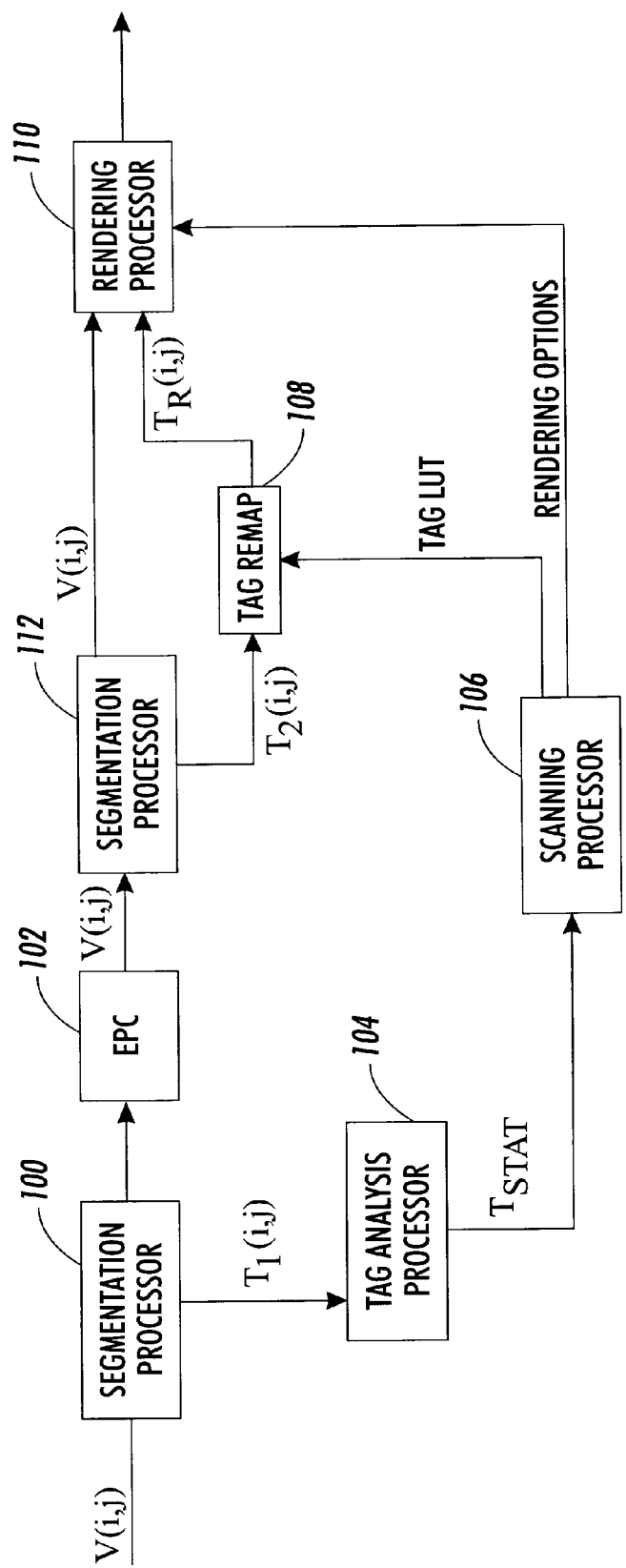
FIG. 5 is an alternate embodiment of a circuit to classify scanned images based on segmentation tags statistics.

Referring now to FIG. 5, there is shown a second embodiment of a circuit which is utilized to automatically classify an input document into one of several predetermined classes based on segmentation tag statistics. The circuit of FIG. 5 operates in a similar manner as that of FIG. 4, without intermediate storage of the segmentation tags in the EPC. More specifically, image data V(i,j) is fed to segmentation processor 100 which analyzes the video image data and generates a first pass segmentation tag $T_1(i,j)$ identifying the image class of each pixel within the video image data. From the segmentation processor, the video image data is fed to electronic pre-collation memory (EPC) 102.

The first pass segmentation tags $T_1(i,j)$ generated at segmentation processor 100 are fed to tag analysis processor 104. Tag analysis processor 104 remaps the first pass segmentation tags and collects statistics for the remapped tags associated with a block of image data and produces a tag statistics signal $T_{stat}$. The tag statistics signal $T_{stat}$ is fed to a scanning control processor 106 wherein the image type for the block of image data is determined based on the tag statistics. The image type identifies the content of the block of image data. Based on the image type, processor 106 identifies an appropriate tag lookup table and optimizes rendering options. Processor 106 loads the tag LUT into a tag remap circuit 108.

With the tag LUT loaded in remapping circuit 108, the video image data V(i,j) is recalled from EPC 102 and passed through a second segmentation processor 112 which generates second pass segmentation tags $T_2(i,j)$ from the stored image data V(i,j). The second pass tags are then remapped to rendering tags $T_R(i,j)$ at tag remap 108. The remapped rendering tags $T_R(i,j)$ and the recalled video image data $V(i,j)$ are then fed to rendering processor 110 wherein the and the image data is rendered to provide print ready for output on a suitable IOT.

In summary, the present invention provides a system and method for classifying image data based on tag statistics and rendering the image data accordingly to provide an optimum image quality. While the present invention has been described with reference to various embodiments disclosed herein, it is not to be confined to the details set forth above, but it is intended to cover such modifications or changes as made within the scope of the attached claims.

What is claimed is:

1. A method of processing a block of image data, comprising:

receiving first pass segmentation tags for a plurality of pixels within the block of image data;

determining an image type for the block of Image data based on a set of predefined rules using statistics compiled from the first pass segmentation tags; and generating rendering tags for pixels within the block of image data as function of second pass segmentation tags and the image type, wherein the set of predefined rules comprises
        identifying the block as being of a first Image type if the ratio of the percentage of pixels of a first image class and the percentage of pixels of a second image class is greater than a first threshold; and
        identifying the block as being of a second image type if the ratio of the percentage of pixels of the second image class and the percentage of pixels of the first image class is greater than a second threshold.

2. A method of processing a block of image data, comprising:

generating a set of first pass segmentation tags for a plurality of pixels within the block of image data;

remapping a plurality of segmentation tags within the set of first pass segmentation tags to generate a set of remapped segmentation tags;

compiling statistics from the set of remapped segmentation tags;

using the compiled statistics compiled to determine an image type for the block of image data based on a set of predefined rules; and generating rendering tags for pixels within the block of image data as a function of second pass segmentation tags and the image type.

3. The method of claim 2, wherein the set of predefined rules comprises:

identifying the block as being of a first image type if the ratio of the percentage of pixels of a first image class and the percentage of pixels of a second image class is greater than a first threshold; and identifying the block as being of a second image type if the ratio of the percentage of pixels of the second image class and the percentage of pixels of the first image class is greater than a first threshold.

4. The method of claim 2, wherein the step of generating rendering tags comprises:

obtaining second pass segmentation tags for a plurality of pixels within block of image data; and remapping the second pass segmentation tag for each pixel within the plurality of pixels to a rendering tag using a tag lookup table, the tag lookup table mapping each image class represented by the second pass segmentation tags to one of the rendering tags according to the image type for the block of image data.

5. The method of claim 4, wherein the step of obtaining second pass segmentation tags retrieves a plurality of the first pass segmentation tags from storage.

6. The method of claim 2, further comprising rendering the block of image data using said rendering tags.

7. A system for processing image data, comprising:

a segmentation processor connected to receive a block of image data, the segmentation processor generating segmentation tags for pixels within the block of image data;

a tag analyzer connect to receive the segmentation tags and compile tag statistics for the received segmentation tags;

a scanning processor connected to receive the compiled tag statistics, the scanning processor determining an image type for the block of image data based on the compiled tag statistics and Identifying a tag lookup table based on the image type; and a tag remapping circuit connected to receive the segmentation tags, the tag remapping circuit using the tag lookup table to remap the segmentation tags to rendering tags.

8. The system of claim 7, wherein the tag analyzer comprises:

a tag remapping circuit connect to receive a plurality of the segmentation tags and remap the received segmentation tags to a set of remapped segmentation tags; and a statistics compilation circuit connected to receive the set of remapped segmentation tags and compile statistics from the remapped segmentation tags.

9. The system of claim 7, wherein the scanning processor uses the compiled statistics to determine the image type based on a set of predefined rules.

10. A method of processing image data, comprising:

receiving a block of image data;

generating set of segmentation tags, the set of segmentation tags including a segmentation tag for each pixel within a plurality of pixels from within the block of image data;

compiling statistics from the set of segmentation tags;

using the compiled statistics to determine an image type for the block of image data based on a set of predefined rules; and generating rendering tags for pixels within the block of image data as a function of the set of segmentation tags and the image type for the block of image data.

11. The method of claim 10, wherein the set of predefined rules comprises:

identifying the block as being of a first image type it the ratio of the percentage of pixels of a first image class and the percentage of pixels of a second image class is greater than a first threshold; and identifying the block as being of a second image type if the ratio of the percentage of pixels of the second image class and the percentage of pixels of the first image class is greater than a second threshold.

12. The method of claim 10, further comprising rendering the block of image data using said rendering tags.

13. The method of claim 10, wherein the step of generating rendering tags remaps segmentation tags from the set of segmentation tags to the rendering tags.

* * * * *